Apr. 17, 1923.  
J. H. WOODWARD  
HORSE COLLAR  
Filed Aug. 15, 1921
1,451,750
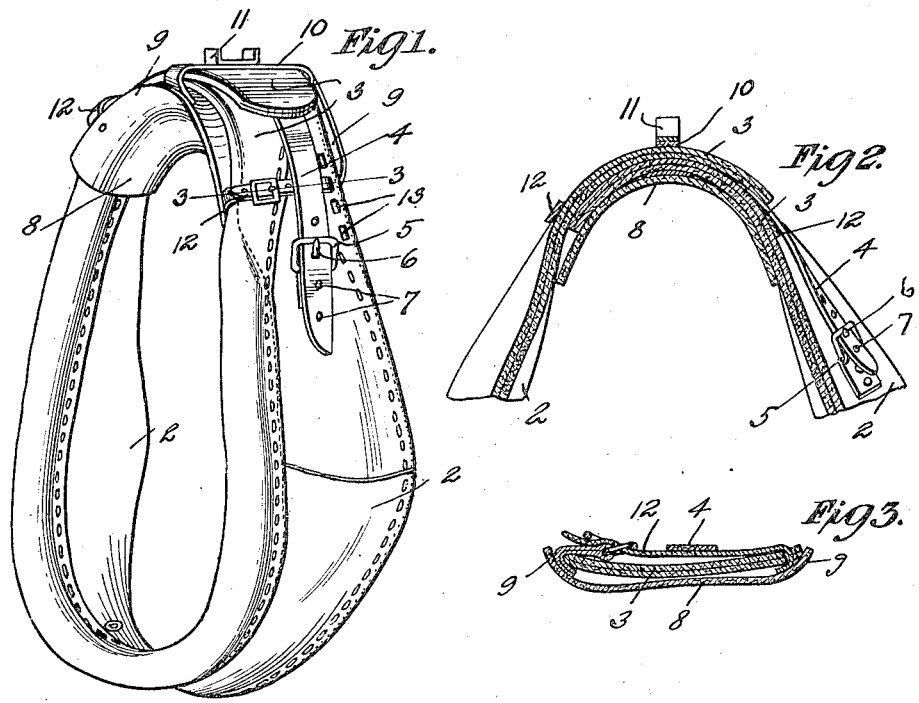
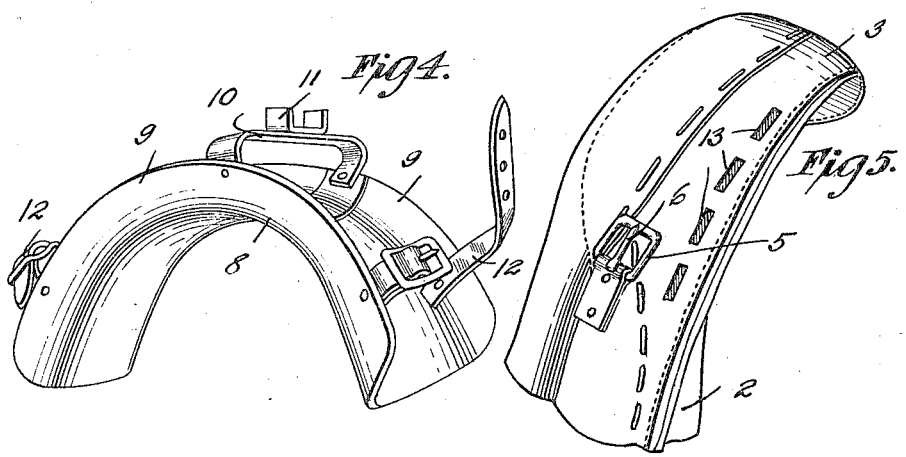
Inventor  
John Howard Woodward
By C. C. Shepherd  
Attorney Patented Apr. 17, 1923.

1,451,750

UNITED STATES PATENT OFFICE.

JOHN HOWARD WOODWARD, OF COLUMBUS, OHIO, ASSIGNOR TO THE J. H. & F. A. SELLS COMPANY, OF COLUMBUS, OHIO, A CORPORATION OF OHIO.

HORSE COLLAR.

Application filed August 15, 1921. Serial No. 492,422.

*To all whom it may concern:*

Be it known that JOHN HOWARD WOODWARD, a citizen of the United States, residing at Columbus, in the county of Franklin and State of Ohio, has invented certain new and useful Improvements in Horse Collars, of which the following is a specification.

This invention relates to improvements in horse collars, and has for its primary object to provide an adjustable and readily attachable horse collar wherein is embodied improved features of construction designed to facilitate the adjustment of the collar to render the latter properly adaptable to the physical characteristics of each particular animal upon which it is placed, and to enable the said collar, after adjustment, to readily conform to the animal by forming the collar of substantially flexible materials throughout and to thereby eliminate the rigid fittings so commonly employed in the ordinary types of adjustable collars.

In carrying out the invention there is provided a horse collar which consists essentially of a suitably stuffed substantially oval shaped body, which is formed to include shoulder pads having separable overlapping neck engaging ends, which are adapted to be securely and adjustably connected together by providing a strap upon one of the overlapping ends and a buckle upon the other end, the said buckle being disposed at a position materially below and spaced from the overlapping portions of said ends, in order that the strap may be adjusted from the side of the collar instead of at the top thereof as is common in the average collar construction of the adjustable type.

Another object of the invention resides in positioning a substantially flexible shoulder pad beneath the overlapping ends of the collar, the said pad being formed from leather so as to be capable of properly accommodating itself to the neck formation of an animal, and in providing improved means for retaining the shoulder pad in its position of application in connection with the collar, the said means admitting of what may be termed circumferential adjustment of the shoulder pad, in order that the latter may be at all times located in the exact center of the collar irrespective of the relative adjustment between the overlapping ends of the shoulder pads.

For a more complete understanding of the invention reference is to be had to the following description and to the accompanying drawing, in which similar characters of reference denote like and corresponding parts throughout the several views thereof.

In said drawing:

Figure 1 is a perspective view of a horse collar constructed in accordance with the features of the present invention, Figure 2 is a vertical sectional view taken through the upper portion of the collar, Figure 3 is a transverse sectional view taken through the collar on the plane indicated by the line 3—3 of Figure 1, Figure 4 is a detail view of the neck pad, and Figure 5 is a detail view of one of the ends of the shoulder pad.

Referring more particularly to the details of the invention, there is provided a horse collar which is generally of the usual shape and design, and includes a stuffed body of substantially oval form. This body is preferably formed from a stout leather casing and is provided with a suitable filler which will impart to the body the necessary yieldable qualities in order that the same may be comfortably worn by a draft animal. The body of the horse collar is suitably stuffed so as to produce the relatively enlarged clearing shoulder pads 2, which are integrally united at the lower end of the collar but are formed at the upper ends thereof to include separable, adjustable and overlapping neck ends 3, which by being relatively adjusted will enable the effective diameter or size of the collar to be contracted or expanded for the purpose of enabling the collar to be adapted to draft animals of varying proportions or to permit the collar to be adjusted to conform with the change in condition in any particular animal.

The neck ends 3 are reduced in thickness and width so as to be pliable and capable of being readily manipulated. The relative adjustment thereof is effected by providing one of ends 3 with a fixed strap 4, and in equipping the other end with a buckle member 5 through which the strap 4 may be retained and adjustably secured. It will be observed that the buckle 5 is positioned upon the collar in such manner that the same will be located at a material distance below the overlapping portions of the ends 3, a feature which is of considerable importance in that it enables the strap 4 to be adjusted from the side of the collar instead of at the upper end thereof, as is customary in collars of this character. It will be understood that the buckle will include the usual pivoted tongue 6, which may be engaged with any one of a plurality of openings 7 provided in the strap 4. By this construction it will be manifest that by actuating the strap 4, the ends 3 may be drawn together or relatively separated so as to secure the necessary contraction or expansion in the effective size of the collar.

In conjunction with this construction, there is provided at the upper end of the collar and beneath the overlapping ends 3, a neck pad 8. This pad is preferably formed from a substantially flexible material, such as leather, and is adapted to engage with and conform to the neck of the animal upon which the collar is being worn, in order to prevent the overlapping ends of the collar from directly engaging with the neck of the animal. The pad 8 is of substantially semi-circular form and is of greater width than the ends 3, the outer edges of the pad 8 being upwardly bent as at 9, so that the said pad 8 will be enabled to receive the neck ends 3 and to prevent their engagement with the neck of the animal, thus eliminating rubbing or other undue friction. The central portion of the neck pad is provided with a bar 10 suitably secured thereto in any rigid manner and having the major portion thereof spaced from the upper surface of the pad 8 so that the overlapping ends 3 of the collar may pass beneath the bar, as clearly shown. The bar 10 is equipped with a guide piece 11, capable of receiving the usual hame strap construction, not shown.

It will be apparent that when the ends 3 are relatively adjusted, the collar will be contracted or expanded by drawing one of the ends 3 toward the side of the collar on which the buckle member 5 is situated. For this reason it is necessary that the neck pad 8 be adjustable around the inner periphery of the collar, in order that the said neck pad will at all times be positioned in the exact center of the collar and not to one side thereof in order that the structure may be properly adapted to the neck of a draft animal. This feature is accomplished by providing the ends of the pad 8 with straps 12, which pass upwardly through any one of a plurality of openings 13 provided in the neck end 3 on which the buckle member is mounted. By this construction the straps 12 will serve to maintain the neck pad against dislocating influences, and that by locating the straps 12 in any one of the openings 13 the desired circumferential adjustment of the pad 8 may be readily secured. It is only necessary to form the openings 13 in but one of the ends 3 to secure the adjustment and retention of the neck pad, the strap 12 at the opposite end of the neck pad being merely passed over the ends 3 without penetrating the latter.

In view of the foregoing description taken in conjunction with the accompanying drawing, it will be apparent that the present invention provides a horse collar of simple yet efficient construction and one which may be adjusted with a very considerable degree of facility. It will be observed that metallic parts in the neck pad construction are substantially eliminated, and the neck pad as a whole is formed from a relatively flexible material that will admit of the conformation of the pad to the neck of an animal after very short use. Moreover, by locating the buckle 5 on the side of the collar the ends 3 may be adjusted relatively when the collar is applied, while the operator is standing on the ground. Then, by the method of securing the neck pad, to the collar the said pad may be properly maintained in the true center of the collar irrespective of the relative adjustment of the ends 3 and effectively prevented from creeping around or losing its adjustment on the inner periphery of the collar.

What is claimed is:

In a horse collar, a substantially yieldable body formed to include integral shoulder pads having separable overlapping neck ends at least one of the said neck ends being provided with a plurality of openings, an adjustable connection between said ends, a neck pad arranged within said collar to bridge said ends, said pad being adjustable to maintain a true central position upon said collar irrespective of relative adjustment between said neck ends, and a securing strap carried by said pad and arranged to pass selectively through one of plurality of openings, whereby the fixed positions of adjustment of said neck pad may be maintained.

In testimony whereof I affix my signature.

JOHN HOWARD WOODWARD.